(12) United States Patent
Watanabe et al.

(10) Patent No.: US 7,677,430 B2
(45) Date of Patent: Mar. 16, 2010

(54) COLD-PRESSURE WELDING METHOD AND METAL PRODUCT WELDED BY THE METHOD

(75) Inventors: Kunihiko Watanabe, Yokkaichi (JP); Toshiaki Suzuki, Yokkaichi (JP); Shiko Kodama, Itami (JP)

(73) Assignees: Autonetworks Technologies, Ltd., Mie (JP); Sumitomo Wiring Systems, Ltd., Mie (JP); Sumitomo Electric Industries, Ltd., Osaka (JP); Sumiden Asahi Industries, Ltd., Itami-shi (JP)

(*) Notice: Subject to any disclaimer, the term of this patent is extended or adjusted under 35 U.S.C. 154(b) by 615 days.

(21) Appl. No.: 11/185,696

(22) Filed: Jul. 21, 2005

(65) Prior Publication Data

US 2006/0016859 A1 Jan. 26, 2006

(30) Foreign Application Priority Data

Jul. 23, 2004 (JP) .............................. 2004-216003

(51) Int. Cl.
*B23K 20/12* (2006.01)
(52) U.S. Cl. ...................... 228/115; 228/3.1; 29/893.34; 29/43
(58) Field of Classification Search .................. 228/115, 228/3.1; 269/43, 139, 287, 154, 37; 29/43; 72/363, 463; 425/358, 451.9
See application file for complete search history.

(56) References Cited

U.S. PATENT DOCUMENTS 4,315,175 A * 2/1982 Hamilton et al. .............. 310/71

FOREIGN PATENT DOCUMENTS

| JP | A-38-008562 | 5/1957 |
| JP | A-52-005486 | 1/1977 |
| JP | A-01-127124 | 5/1989 |
| JP | A 02-280979 | 11/1990 |

OTHER PUBLICATIONS

Marks' Standard Handbook for Mechanical Engineering, 10th Edition.*
Yosetu Gijyutsu Soran (Welding Technology Handbook) Sangyo Gijyutsu Service Center Co., Ltd.; Apr. 15, 1884; pp. 1-21.
Liu Zhongqing, "Welding of Heterogeneous Metals Fifth Lecture Heterogeneous Non-Ferrous Metal Welding—Welding of Copper and Aluminum," Machinist Metal Forming, Jun. 9, 1994, pp. 30-31, 1994- issue 6.
Yang Ruicheng et al., Materials for Mechanical Engineering, Jul. 31, 2000, pp. 84-88, Chongqing University Press.

* cited by examiner

*Primary Examiner*—Jessica L. Ward
*Assistant Examiner*—Erin B Saad
(74) *Attorney, Agent, or Firm*—Oliff & Berridge, PLC

(57) ABSTRACT

A welded metal product includes a first metal plate having a first surface and a second surface opposed to the first surface; and a second metal plate being cold-pressure welded with the second surface of the first metal plate by directly pressing the first metal plate with the die. The first surface has a recess portion which is deformed by directly pressing with a die. A hardness of the first metal plate is greater than a hardness of the second metal plate.

7 Claims, 7 Drawing Sheets

COLD-PRESSURE WELDING METHOD AND METAL PRODUCT WELDED BY THE METHOD

BACKGROUND OF THE INVENTION

1. Field of the Invention

The present invention relates to a cold-pressure welding method and a metal product welded by the cold-pressure welding method.

2. Description of the Related Art

Conventionally, a method for producing a welded metal product by piling a plurality of metal plates together and welding these plates has been carried out as follows. As shown in FIG. 6 and FIG. 7, two metal plates 100 and 101 piled together are pressed by a die 102 in a direction intersecting the surface of the plate, and are deformed and welded so that a recess portion 103 is formed on the side of the surface thereof, thus producing a welded metal product 104. According to this cold-pressure welding method, when the die 102 presses the metal plates 100 and 101, the metal plates 100 and 101 are deformed to be recessed, and areas 100a and 101a, which are pressed by the die 102, of the surfaces of the metal plates 100 and 101 are brought into contact with each other, so that the metal plates 100 and 101 are welded together. The cold-pressure welding method is disclosed in JP-A-2-280979.

SUMMARY OF THE INVENTION

When the metal plates 100 and 101 are pressed and deformed by the die 102 so as to be recessed, the areas of the metal plates 100 and 101 pressed by the die 102 are extended and deformed while being moved from the center toward the outer periphery. Conventionally, the metal plate 100 having a smaller hardness of the two metal plates different in hardness has been disposed on the side of the surface, i.e., on the side where the die 102 comes into direct contact with and presses the plate.

When the die 102 directly presses the metal plate 100 having the smaller hardness in this way, most parts of the quantity of extension caused by the entrance of the die 102 are assigned to the easily deformable metal plate 100, and an excessive slip occurs in the contact interface between the metal plates 100 and 101. As a result, there is a fear that the joining strength between the metal plates 100 and 101 will decrease.

It is an object of the invention to enhance a joining strength between the metal plates.

According to one aspect of the invention, there is provided with a cold-pressure welding method for producing a welded metal product, including:

piling a plurality of metal plates different in hardness together; pressing the metal plates by a die in a direction intersecting surfaces of the metal plates; and welding and deforming the metal plates so as to form a recess portion. At least one metal plate having a greater hardness of the metal plates different in hardness is disposed on a surface side of the metal plates toward which the die presses.

According to another aspect of the invention, there is provided with a welded metal product including: a plurality of metal plates different in hardness together being piled to be pressed by a die in a direction intersecting surfaces of the metal plates, so that the metal plates are welded and deformed so as to form a recess portion. At least one metal plate having a greater hardness of the metal plates different in hardness is disposed on a surface side of the metal plates toward which the die presses.

According to another aspect of the invention, there is provided with a cold-pressure welding method including: piling a plurality of metal plates different in hardness; pressing at least one metal plate having a greater hardness of the metal plates different in hardness by a die in a direction intersecting surfaces of the metal plates so that the metal plates are cold-pressure welded and deformed to form a recess portion on a pressed surface side of the metal plates.

According to another aspect of the invention, there is provided a welded metal product including: a first metal plate having a first surface and a second surface opposed to the first surface, the first surface having a recess portion which is deformed by directly pressing with a die; and a second metal plate being cold-pressure welded with the second surface of the first metal plate by directly pressing the first metal plate with the die. A hardness of the first metal plate is greater than a hardness of the second metal plate.

When the metal plates are pressed and deformed by the die so as to be recessed, the areas of the metal plates pressed by the die are extended and deformed while being moved from the center toward the outer periphery. If the die directly presses one having a smaller hardness of the metal plates, most parts of the quantity of extension caused by the entrance of the die are assigned to the easily deformable metal plate. An excessive slip occurs in the contact surface between the metal plates. As a result, the joining strength between the metal plates will decrease.

In contrast, according to the above-aspects of the invention, one metal plate having a greater hardness than any other plate is directly pressed by a die. Therefore, when the metal plate having the greater hardness is deformed so as to be recessed and so as to be extended from the center toward the outer periphery, another metal plate having a smaller hardness is extended from the center toward the outer periphery in accordance with the deformation. Therefore, the quantity of extension of the metal plate having the greater hardness and the quantity of extension of the metal plate having the smaller hardness become almost the same. As a result, an excessive slip does not occur in the joining surface between the metal plates, and the aforementioned peeling does not occur. Therefore, the joining strength between the metal plates is high.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

First Embodiment

Figure 1:
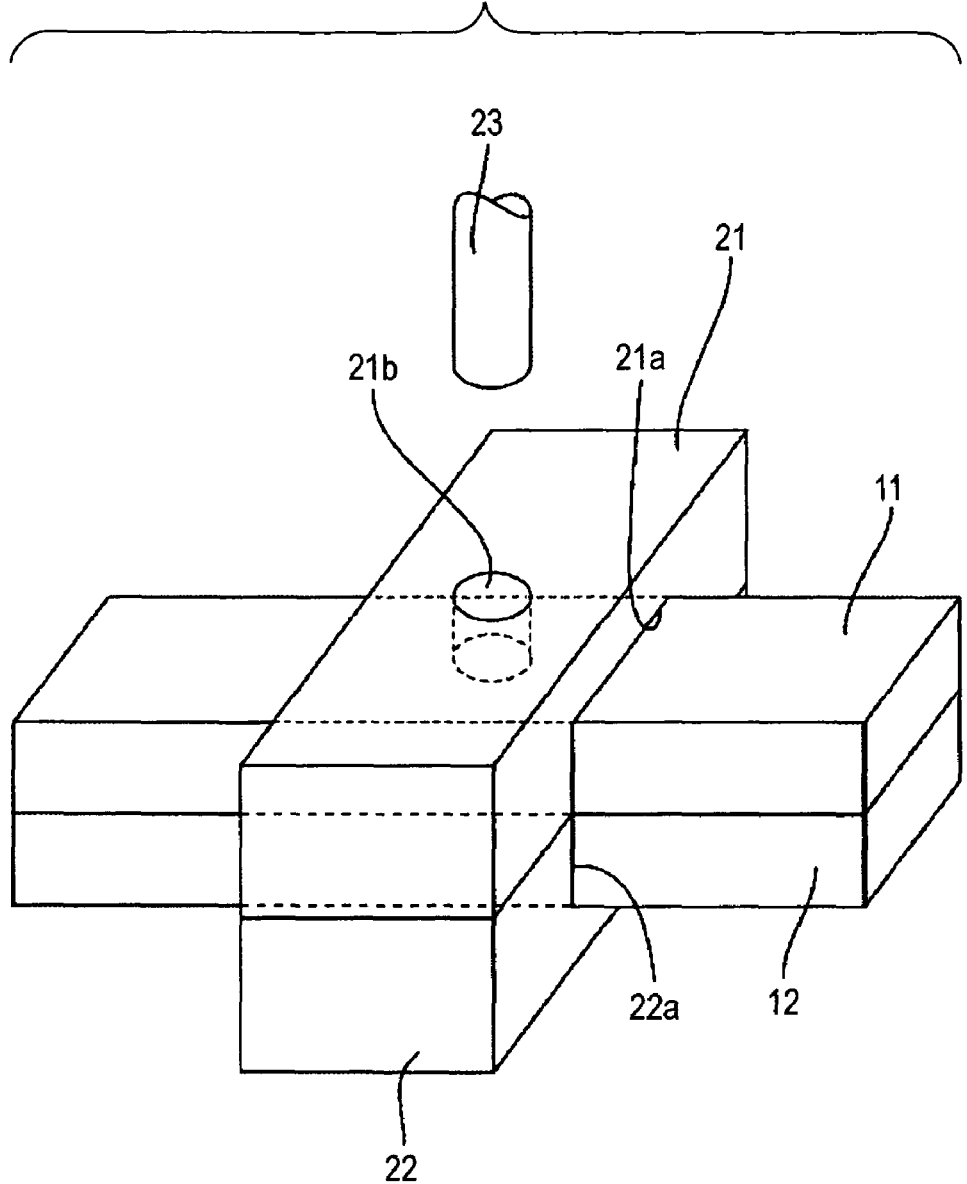
FIG. 1 is a perspective view of the first embodiment.
Figure 2:
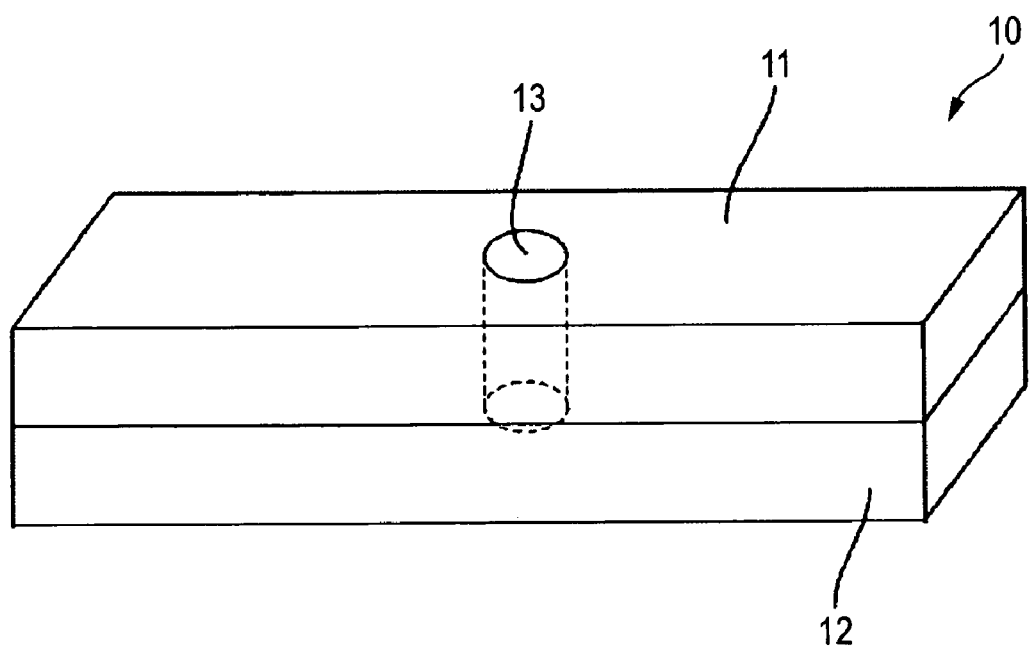
FIG. 2 is a perspective view of a welded metal product.
Figure 3:
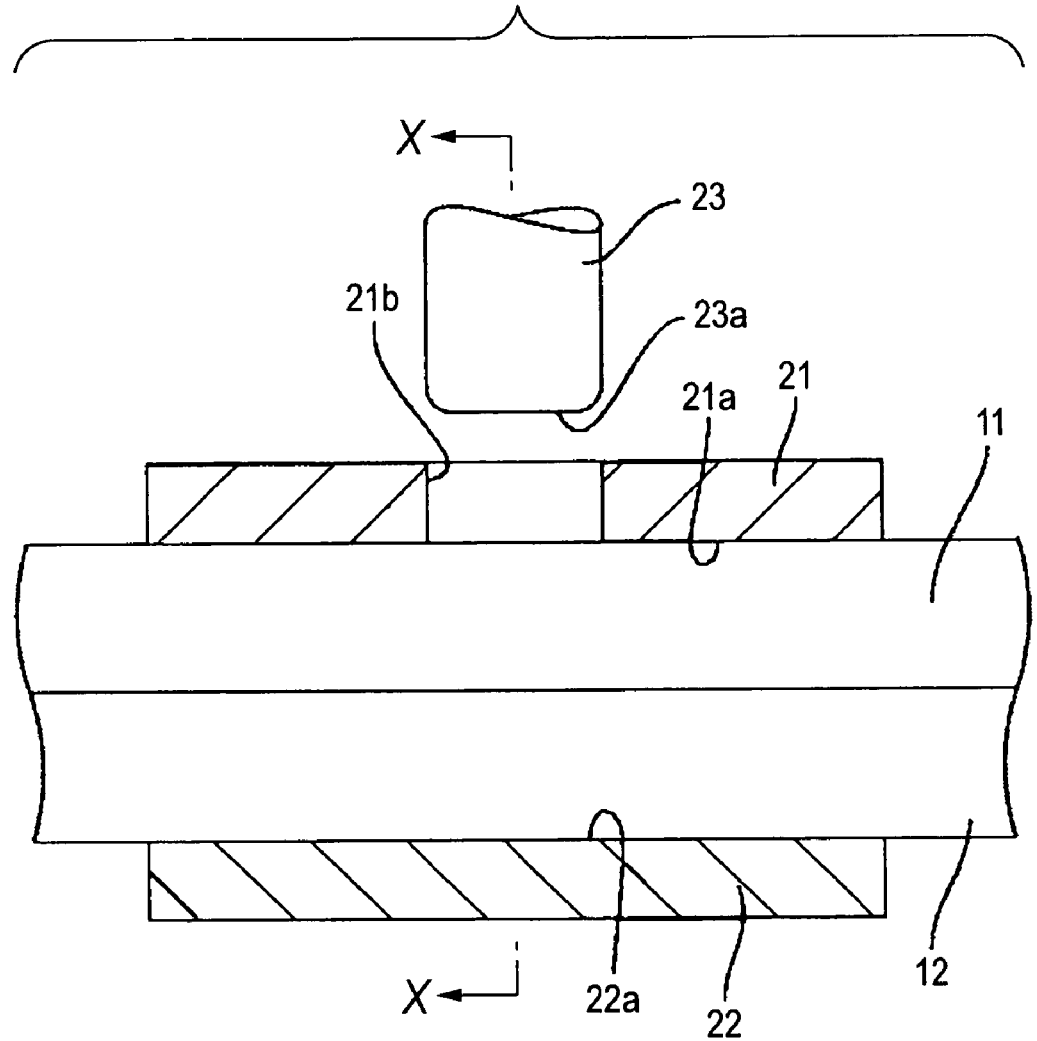
FIG. 3 is a cross sectional view showing a state before being welded.

A first embodiment in which the present invention is embodied will be hereinafter described with reference to FIG. 1 to FIG. 5. A welded metal product 10 according to this embodiment is produced by welding a first metal plate 11 and a second metal plate 12 together. Each of the first metal plate 11 and the second metal plate 12 is constant in thickness over the whole thereof, is long in forward and backward directions, and is shaped like a square over the overall length (forward and backward directions) in width. The overall length and width of the first metal plate 11 are substantially equal to those of the second metal plate 12. The thickness of the metal plate 11 is substantially equal to that of the metal plate 12.

The first metal plate 11 is made of a copper alloy, and the hardness thereof is HV115, whereas the second metal plate 12 is made of copper, and the hardness thereof is HV90. In other words, the hardness of the first metal plate 11 is higher than that of the second metal plate 12, and the first metal plate 11 is harder to deform than the second metal plate 12.

The first metal plate 11 and the second metal plate 12 are electrically conductively welded together according to a cold-pressure welding method using a die 23 in a state of laying one on top of the other so that the plate surfaces of the first and second metal plates 11 and 12 reach a facial contact state in a horizontal posture. Herein, the first metal plate 11 higher in hardness is placed on the side of the upper surface (front surface) of the second metal plate 12. This arrangement results from considering that the die 23 that is a welding method presses both metal plates 11 and 12 downward from above (i.e., in a direction substantially perpendicular to the plate surfaces of the metal plates 11 and 12). It is to be noted that, in the state in which the metal plates 11 and 12 are piled together, the front end surfaces, the rear end surfaces, and the right and left side faces of the metal plates 11 and 12 are consecutive to each other in a flush manner. The two metal plates 11 and 12 laid on each other are fixed in the piled state by means of upper and lower molds 21 and 22.

The upper mold 21 is shaped like a block as a whole, and has a groove part 21a, which is used to accept the first metal plate 11, formed on its lower surface. The groove part 21a is opened in the front and rear end surfaces of the upper mold 21, and positions and accepts the first metal plate 11 without a shake (displacement) of the first metal plate 11 in the rightward and leftward directions (i.e., in the direction parallel to the plate surface of the metal plate 11). In the state in which the first metal plate 11 is set in the groove part 21a, the front and rear end parts of the first metal plate 11 protrude outwardly from the upper mold 21. Additionally, the upper surface of the first metal plate 11 comes into facial contact with the ceiling surface (upper surface) of the groove part 21a, and the lower surface of the first metal plate 11 is contiguous to the lower surface of the upper mold 21 in a flush manner.

The upper mold 21 further has a circular guide hole 21b formed in upward and downward directions from its upper surface to the ceiling surface (inner surface) of the groove part 21a (i.e., in the direction perpendicular to the plate surfaces of the metal plates 11 and 12). The guide hole 21b is formed almost at the center of the groove part 21a in the width direction (rightward and leftward directions) and in the forward and backward directions. The die 23 is guided by this guide hole 21b when welded. The die 23 is shaped like a cylinder whose axial line is directed in the upward and downward directions, and can be fitted into the guide hole 21b from the upper side of the upper mold 21 without a shake in the forward, backward, leftward, and rightward directions. The outer diameter of the die 23 is constant ranging from its lower end to an area where the die 23 is contained in the guide hole 21b when a welding process is completed. The lower surface of the die 23 is a pressing surface 23a that is concentric with the die 23 and that is shaped like a circle smaller than the outer diameter of the die 23. The pressing surface 23a is a flat surface perpendicular to the direction in which the die 23 presses the metal plates 11 and 12.

The lower mold 22 is shaped like a block as a whole, and has a groove part 22a, which is used to accept the second metal plate 12, formed on its upper surface. The groove part 22a is opened in the front and rear surfaces of the lower mold 22, and positions and accepts the second metal plate 12 without a shake (displacement) of the second metal plate 12 in the rightward and leftward directions (i.e., in the direction parallel to the plate surface of the metal plate 12). In the state in which the second metal plate 12 is set in the groove part 22a, the front and rear end parts of the second metal plate 12 protrude outwardly from the lower mold 22. Additionally, the lower surface of the second metal plate 12 comes into facial contact with the lower surface of the groove part 22a, and the upper surface of the second metal plate 12 is contiguous to the upper surface of the lower mold 22 in a flush manner.

The upper mold 21, the lower mold 22, and the die 23 are all alloy tool steels (SKD11), and the hardness thereof ranges from HV700 to HV750. In other words, the upper and lower molds 21, 22, and the die 23 are greater in hardness than the first metal plate 11.

Next, the operation of this embodiment will be described.

To produce the welded metal product 10 by welding the first metal plate 11 and the second metal plate 12 together, the second metal plate 12 is fitted (set) to the groove part 22a of the lower mold 22, and the first metal plate 11 is laid on the upper surface of the second metal plate 12. Thereafter, the groove part 21a is fitted to the first metal plate 11 while covering the top thereof with the upper mold 21, and the lower surface of the upper mold 21 is brought into facial contact with the upper surface of the lower mold 22, thus joining the molds 21 and 22 together. In this state, the metal plates 11 and 12 laid on each other are sandwiched between the lower surface of the groove part 22a of the lower mold 22 and the ceiling surface of the groove part 21a of the upper mold 21, whereby both metal plates 11 and 12 are held without a shake in the upward, downward, rightward, and leftward directions with respect to the upper and lower molds 21 and 22. Herein, the metal plates 11 and 12 are allowed to be deformed in the forward and backward directions.

When the die 23 is caused to proceed (move down) into the guide hole 21b from this state, the pressing surface 23a of the lower end of the die 23 presses the upper surface (front surface) of the first metal plate 11 from above, and dents the upper surface of the first metal plate 11. After that, when the die 23 further moves down, the first metal plate 11 is pressed toward the die 23, and is deformed as if to sink downward (to be recessed). This deformed part assumes the shape of a closed-end cylinder. A horizontal round plate-like part 11a, which corresponds to (comes into direct contact with) the pressing surface 23a of the die 23, of the deformed part having the shape of the closed-end cylinder of the first metal plate 11 presses and dents the upper surface of the second metal plate 12.

Figure 4:
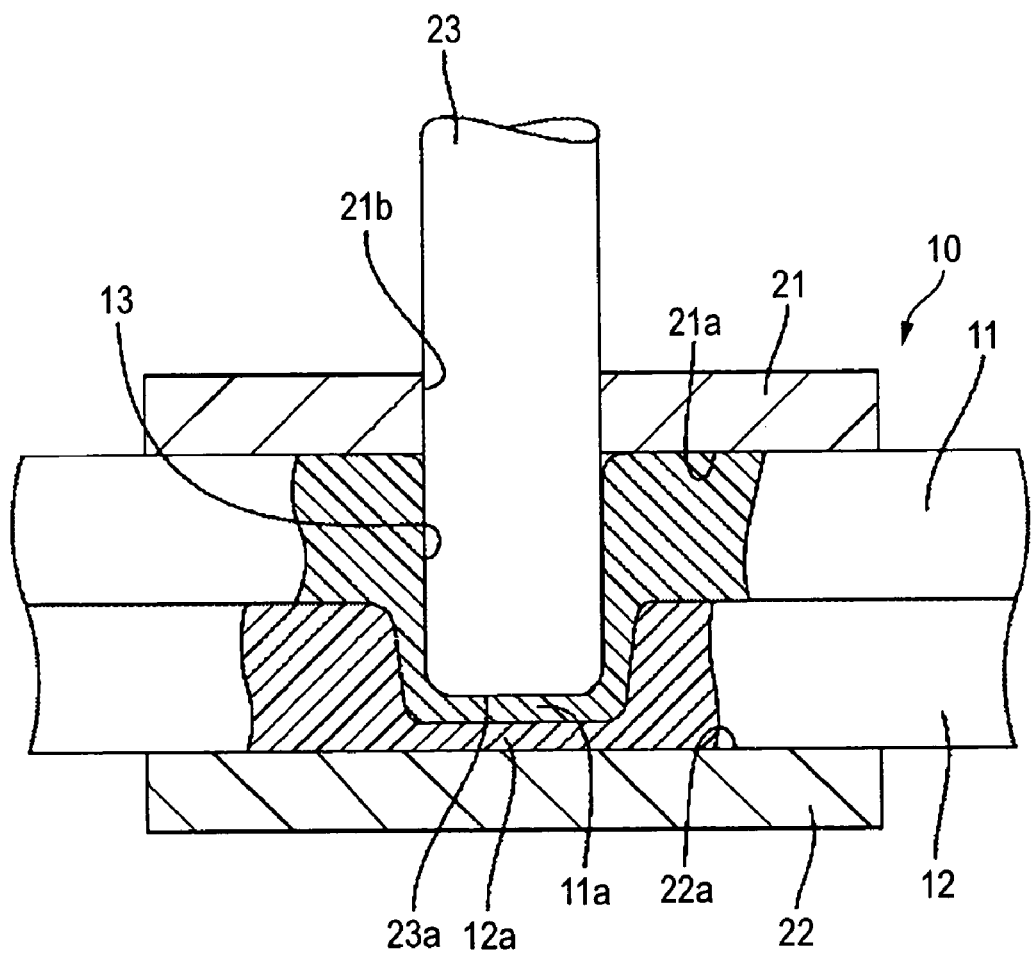
FIG. 4 is a cross sectional view showing a state in which a welding process is completed.
Figure 5:
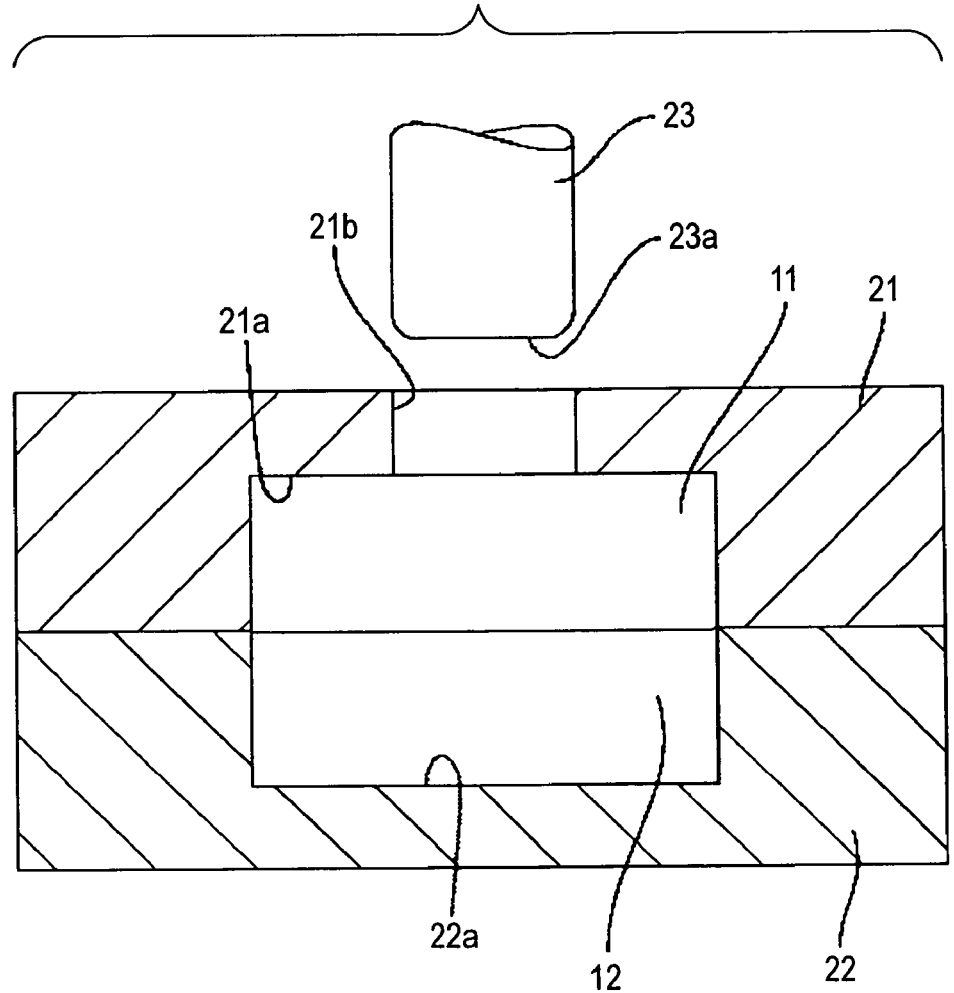
FIG. 5 is a cross sectional view along line X-X of FIG. 3.
Figure 6:
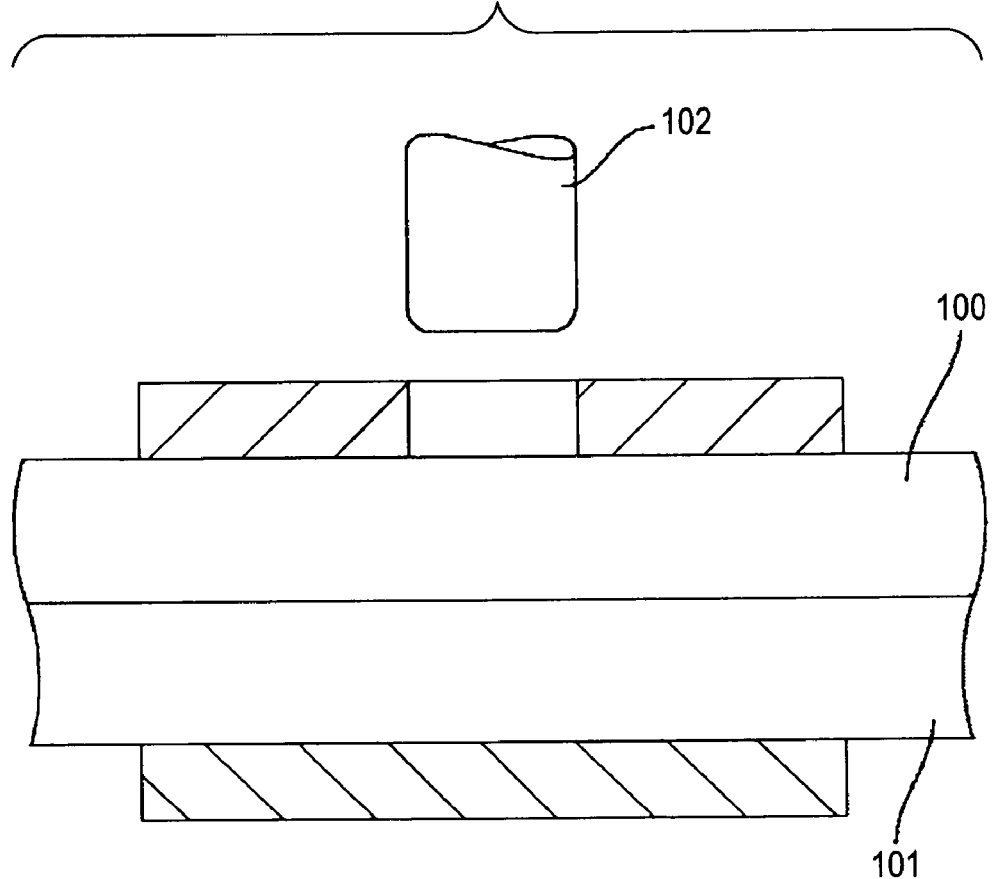
FIG. 6 is a cross sectional view showing a state before being welded in a related art.
Figure 7:
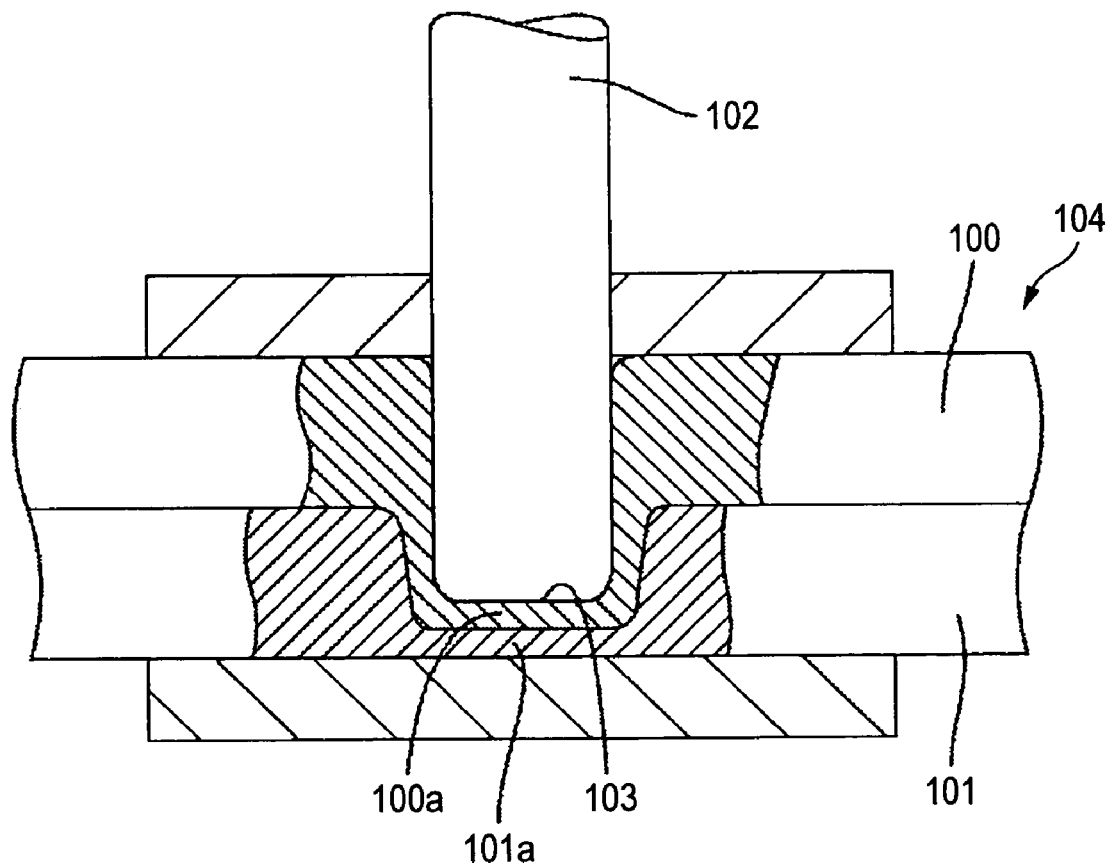
FIG. 7 is a cross sectional view showing a state in which a welding process is completed in the related art.

When the die 23 descends to the position where the welded process is completed, a circular recess portion 13 is formed on the upper surface of the first metal plate 11 as shown in FIG. 4, and round plate-like parts 11a and 12a, which correspond to the pressing surface 23a of the die 23, of the metal plates 11 and 12 are reduced in thickness. The thinned round plate-like part 12a of the second metal plate 12 is laid on the upper surface of the round plate-like part 11a of the first metal plate 11. The round plate-like parts 11a and 12a of the metal plates 11 and 12 reach a state of being vertically sandwiched between the pressing surface 23a of the die 23 and the lower surface of the groove part 22a of the lower mold 22.

When the metal plates 11 and 12 are deformed by the die 23 in this way, the lower surface of the round plate-like part 11a (a substantially circular area that corresponds to the pressing surface 23a of the die 23) of the first metal plate 11 is firmly joined (fixed) to the upper surface of the round plate-like part 12a (a substantially circular area that corresponds to the pressing surface 23a of the die 23) of the second metal plate 12, and, as a result, the first metal plate 11 and the second metal plate 12 are welded together, thus forming the welded metal product 10.

In the welding process, when the first metal plate 11 is pressed and deformed by the die 23 so as to be recessed, the round plate-like part 11a of the first metal plate 11 pressed by the die 23 is extended and deformed while being moved from the center of the die 23 toward the outer periphery. If the die 23 directly presses the second metal plate 12 having a smaller hardness, most parts of the quantity of extension caused by the entrance of the die 23 are assigned to the easily deformable second metal plate 12, and an excessive slip occurs in the contact interface (joining surface) between the metal plates 11 and 12. As a result, there is a fear that the joining strength between the metal plates 11 and 12 will decrease.

In contrast, in this embodiment, the first metal plate 11 having a greater hardness is directly pressed by the die 23. Therefore, when the first metal plate 11 having the greater hardness is deformed so as to be recessed and so as to allow the round plate-like part 11a to be extended from the center toward the outer periphery, the second metal plate 12 having a smaller hardness is recessed, and the round plate-like part 12a is deformed so as to be extended from the center toward the outer periphery in accordance with the deformation of the round plate-like part 11a of the first metal plate 11. Therefore, the quantity of extension of the round plate-like part 11a of the first metal plate 11 and the quantity of extension of the round plate-like part 12a of the second metal plate 12 become almost the same. As a result, an excessive slip does not occur in the joining surface (interface) between the first metal plate 11 and the second metal plate 12, and the aforementioned peeling does not occur. Therefore, the joining strength between the first and second metal plates 11 and 12 is high.

According to a result of the experiment, it was understood that the joining strength obtained when the second metal plate 12 having a smaller hardness is directly pressed by the die is 830N (average value of ten samples), whereas the joining strength obtained when the first metal plate 11 having a greater hardness is directly pressed by the die 23 in this embodiment is 1240N (average value of ten samples), i.e., about 1.49 times as high as when the second metal plate 12 is directly pressed.

Other Embodiments

The embodiment is not limited to the described embodiments with reference to the drawings. For example, the following embodiment is included in the technical scope of the present invention. Besides, various modifications can be carried out within the scope without departing from the essentials of the present invention.

(1) Although a description was given of the embodiment in which the two metal plates are piled together, the present invention can be applied to a case in which three or more metal plates different in hardness are piled together.

What is claimed is:

1. A cold-pressure welding method for producing a welded metal product, comprising:
   piling a plurality of metal plates different in hardness together;
   pressing the metal plates by a die in a direction intersecting surfaces of the metal plates; and
   cold-pressure welding and deforming the metal plates so as to form a recess portion, wherein one metal plate having a greater hardness of the metal plates different in hardness is disposed on a surface side of the metal plates toward which the die presses, wherein the hardness of each metal plate other than the one metal plate is at least the hardness of copper,
   the cold-pressure welding and deforming step comprising:
   restricting an extension of the metal plates in a width direction thereof by a lower mold and an upper mold so that widths of the metal plates match each other, and
   wherein the upper mold includes a groove so that the entire width of the one metal plate fits within the groove of the upper mold, and the lower mold includes a groove so that the entire width of the other metal plates fit within the groove of the lower mold, and wherein the die passes through the upper mold.

2. The cold-pressure welding method of claim 1, wherein the one metal plate having the greater hardness and at least one plate of the plurality of plates that is adjacent to the one metal plate having the greater hardness are extended by approximately equal amounts.

3. The cold-pressure welding method of claim 1, wherein adjacent metal plates of the plurality of metal plates are extended by approximately equal amounts.

4. The cold-pressure welding method of claim 1, wherein the one metal plate substantially covers the entire surface of another metal plate.

5. A cold-pressure welding method comprising:
   piling a plurality of metal plates different in hardness;
   cold-pressure welding and deforming the metal plates so as to form a recess portion on a pressed surface side of the metal plates by pressing at least one metal plate having a greater hardness of the metal plates different in hardness by a die in a direction intersecting surfaces of the metal plates, wherein the hardness of each metal plate other than the at least one metal plate is at least the hardness of copper,
   the cold-pressure welding and deforming step comprising:
   restricting an extension of the metal plates in a width direction thereof by a lower mold and an upper mold so that widths of the metal plates match each other, and
   wherein
   the upper mold includes a groove so that the entire width of the at least one metal plate fits within the groove of the upper mold, and
   the lower mold includes a groove so that the entire width of the each metal plate other than the at least one metal plate fits within the groove of the lower mold, and wherein the die passes through the upper mold.

6. The cold-pressure welding method of claim 5, wherein the one metal plate having the greater hardness and at least one plate of the plurality of plates that is adjacent to the one metal plate having the greater hardness are extended by approximately equal amounts.

7. The cold-pressure welding method of claim 5, wherein adjacent metal plates of the plurality of metal plates are extended by approximately equal amounts.

* * * * *